United States Patent
Vartsky et al.

(10) Patent No.: US 7,930,333 B2
(45) Date of Patent: Apr. 19, 2011

(54) HIGH-SPEED, TRUE RANDOM-NUMBER GENERATOR

(75) Inventors: David Vartsky, Rehovot (IL); Doron Bar, Rishon LeZion (IL); Pinchas Gilad, Rehovot (IL); Armin Schon, Nes Ziona (IL)

(73) Assignees: Soreq Nuclear Research Center, Nahal Soreq, Yavne; El-Mul Technologies Ltd., Rehovot ( * ) Notice: Subject to any disclaimer, the term of this patent is extended or adjusted under 35 U.S.C. 154(b) by 1126 days.

(21) Appl. No.: 11/572,318

(22) PCT Filed: Apr. 19, 2005

(86) PCT No.: PCT/IL2005/000407
§ 371 (c)(1),
(2), (4) Date: Jan. 19, 2007

(87) PCT Pub. No.: WO2005/101194
PCT Pub. Date: Oct. 27, 2005

(65) Prior Publication Data
US 2008/0040410 A1 Feb. 14, 2008

(51) Int. Cl.
*G06F 1/02* (2006.01)
(52) U.S. Cl. .................................................. 708/255
(58) Field of Classification Search .................. 708/255
See application file for complete search history.

(56) References Cited

U.S. PATENT DOCUMENTS

| | | | |
|---|---|---|---|
| 6,249,009 B1 | 6/2001 | Kim et al. | |
| 6,512,235 B1 | 1/2003 | Eitan et al. | |
| 6,965,907 B2 * | 11/2005 | Klass | 708/255 |
| 2003/0002627 A1 | 1/2003 | Espinosa et al. | |
| 2003/0018674 A1 | 1/2003 | Figotin et al. | |
| 2005/0175151 A1 * | 8/2005 | Dunham et al. | 378/122 |

FOREIGN PATENT DOCUMENTS

| | | |
|---|---|---|
| EP | 1241565 | 9/2002 |
| WO | 03/088485 | 10/2003 |

* cited by examiner

*Primary Examiner* — Tan V Mai
(74) *Attorney, Agent, or Firm* — Dekel Patent Ltd.; David Klein

(57) ABSTRACT

The present invention produces strings of true random numbers, extracted from field emission of electrons from nano-size emitters (NSE). Electrons may be produced in a miniature, three-electrode vacuum element that consists of a NSE emitter attached to the cathode surface, a close proximity gate electrode and an accelerating electrode (anode). A miniature fast response electron detector may also be inserted into the vacuum vessel. The detector sensitivity may allow single electron detection, with a noise level much lower than the resulting single-electron signal. The accelerated electrons may be directed to the detector and produce electric signals with well-defined pulse height and pulse shape characteristics. The electronic system analyzes the signals from the detector and generates random numbers thereby.

14 Claims, 2 Drawing Sheets

HIGH-SPEED, TRUE RANDOM-NUMBER GENERATOR

FIELD OF THE INVENTION

The present invention relates generally to producing strings of true random numbers, extracted from a quantum mechanical phenomenon.

BACKGROUND OF THE INVENTION

World demand for random number generators is rapidly increasing. Widespread need is found, among others, in the scientific, military, communications and e-commerce fields. With the broadening application spectrum and increasing market volume, the production rate of random number strings from a generator should increase substantially.

Two basic approaches are traditionally followed in the prior art to generate random numbers.

The more common of these is synthetic generation by computer routines. It produces so called "pseudo random numbers". Generation rates of pseudo random numbers by present routines are indeed fast. However, the pseudo random numbers are intrinsically cyclic and thus limited in bit-length. In essence, the resulting numbers are deterministic and can be easily reproduced by expert cryptologists. Specifically, in the fields of mathematical simulations or in encryption applications the pseudo random numbers are inadequate. They can lead to erroneous results of the simulation analysis or to compromising highly sensitive encrypted information.

The second mode of generation is based on natural occurring chaotic phenomena such as thermal noise in resistors or electronic circuits [see for example Ikeda, Jun, US Patent application US20030050943], radioactive decay [A. Figotin US Patent Application US20030018674], or light transmission or reflection from a beam-splitter [J. Soubusta et al. Proceedings, SPIE, 4356, 54-60, (2001)]. In most true random number generators the physical phenomena exploited in constructing the random numbers are thermodynamic or quantum mechanical in nature, thus exhibiting innate statistical fluctuations. Such chaotic phenomena will produce true random numbers, provided technical limitations such as limited amplifier bandwidth, interference from external sources or cyclic phenomena in the electronics system do not perturb the chaotic nature of the source. For example, true random number generators (TRNG) based on elements that produce thermal noise derive the data from very low signals. They suffer from problems of limited bandwidth of the high gain amplifiers, as well as 1/f amplifier noise that interferes with the extracted noise characteristics of the source. Moreover, TRNG are usually slow. The high value of entropy content is offset by the slow rate of number construction. Consequently, prior art number generation rates fail to satisfy increasing customer demand. Another class of TRNG uses radioactive decay as the source for producing non-correlated strings of numbers. In principle, TRNG using radioactive decay can be very fast, but since it is based on a strong radioactive source, safety issues come into play.

One version of thermionic type TRNG, using photon counting of light emission from a black body radiator, is presented in a patent application by M. J. Klass (Random Number Generator, US Patent Application 20030131031). The photon detector depicted in this application is a special type of photomultiplier tube (PMT). Besides the principal operational scheme of photon counting the authors add an option of using a needle mounted inside the detector that serves as a source of electrons. The claims state that the needle can be metallic, or coated with a dielectric of selected electron emission. The information presented concerning the mode of operation of the needle is rather vague. In one mode a gas breakdown should form, due to the electric field on the needle. A second mode is supposedly related to electron generation by the needle. However, electron field emission by either a metallic needle or a coated needle is a very weak phenomenon. By and large, specially coated needles are by far superior electron emitters than simple metallic needles. Yet, even coated needles must be heated to very high temperatures in order to constitute useful electron sources, but no heating scheme is discussed. Moreover, introducing a high temperature electron source inside a PMT is in itself very problematic for tube operation. Thus, it is safe to assert that the suggested needle source of electrons is a poor choice, if at all feasible.

SUMMARY OF THE INVENTION

The present invention produces strings of true random numbers, extracted from field emission of electrons from nano-size emitters (NSE). Electrons may be produced in a miniature, three-electrode vacuum element that consists of a NSE emitter attached to the cathode surface, a close proximity gate electrode and an accelerating electrode (anode). A miniature fast response electron detector may also be inserted into the vacuum vessel. The detector sensitivity may allow single electron detection, with a noise level much lower than the resulting single-electron signal. The accelerated electrons may be directed to the detector and produce electric signals with well-defined pulse height and pulse shape characteristics. The electronic system analyzes the signals from the detector and generates random numbers thereby. It includes an amplifier, high and low voltage discriminators, pulse shape discriminator, pulse shaper, a ring time-to-digital converter (RTDC) and combined shift register and fast clock. The discriminators reject spurious noise and unrelated signals, which lack the specific signatures of the electron-generated pulses. True electron signals are channeled into the RTDC to yield a series of measured time-intervals between successive pulses. Their values exhibit a Poisson distribution. They are used to create a string of true random numbers. In a different mode, pulses of the detected electrons are converted by the shift register and the clock time marks to produce a bit-stream of true random numbers. The data from both generation modes is transferred to the CPU for testing and generating a final string of random numbers.

DETAILED DESCRIPTION OF EMBODIMENTS

Figure 1:
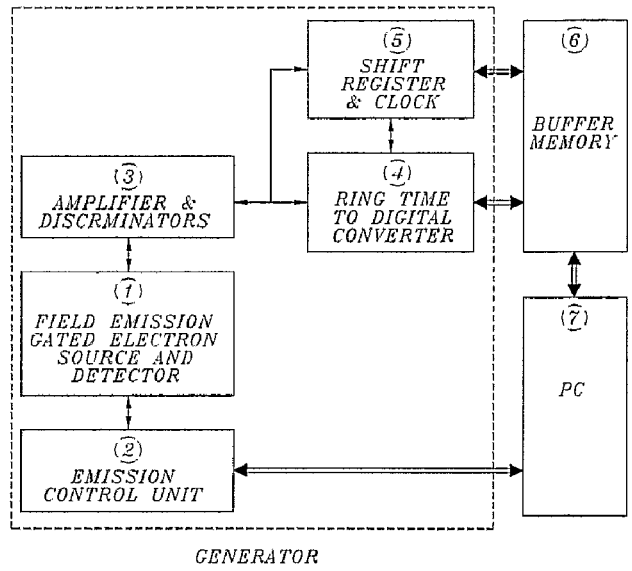
FIG. 1 shows a block diagram of the device, in accordance with an embodiment of the present invention.

The present TRNG invention is based on field emission of electrons from nano-size emitters (NSE) (nanotubes or nanorods), which is a purely quantum mechanical effect. Free electron generation in the device is due to the quantum mechanical effect of tunneling through a potential barrier.

The distribution of time interval between successive electrons is Poissonian in shape. Hence, the arrival time-intervals are readily applicable to random number generation.

Free electrons emerge on the vacuum side of the NSE after tunneling through the potential barrier of the NSE, which is immersed in an externally applied electric field. Electric fields in the order of $10^8$ V/m are required for producing detectable tunneling. High aspect ratio NSEs of small (nanometer size) radius and relatively long tubular stem (order micro-meters) are very effective emitters of electrons. High electric field amplification is produced at the tip of the NSE due to the large geometric factor. Voltage is applied to a gate with a small aperture positioned at close proximity (micrometers) to the tip of the NSE. The threshold voltage for detectable electron tunneling can be as low as a few volts. The emitted electrons are spatially limited within a very narrow flow cone. The electrons can be easily accelerated to a detector, producing a high output signal that can be analyzed by standard electronic circuits. It is noteworthy that a miniscule current of 10 pA will result in about $6 \times 10^7$ detected electrons per second. Currents of 1-10 pA characterize NSE emitters at what is considered to be the field-emission threshold from a single NSE emitter. A number of research laboratories have advanced the scope of knowledge of electron emission from NSE cathodes. Field emission properties of gated carbon nano-tube (CNT) sources are presented for example by results of the ORNL group: M. A. Guillorn et al. Appl. Phys. Lett. 79, 3506 (2001).

Methods for growing CNTs on Si substrates at predetermined locations are well established. Furthermore, current growth methods yield CNTs of the desired dimensions that are vertically aligned relative to the Si surface. A good reference for one method for producing aligned CNTs at specified locations is found in: M. Chhowalla et al. J. Appl. Phys. 90, 5308, (2001). The gated CNT emitters are manufactured applying established MEMS technology. Emission properties of such elements are also extensively documented.

A prerequisite for TRNG sources based on quantum effects is loss of memory with regard to an event (a quantum transition) before a new event takes place. We consider first electric self-field effects due to the electron charge. These effects disappear within times shorter than 100 ps, when the free electron travels beyond the accelerating anode. The second effect is governed by relaxation times of the electronic states in the solid, following electron tunneling. The transition to an equilibrium distribution is accomplished by a series of collisions and energy dissipation processes. Collision times are in the order of fs. The overall process is completed within a time scale of <1 ps. Such time scales have been measured in CNT bundles, as evident from a recent research publication of T. Hartels, R. Fasel and G. Moos (T. Hartel et al., App. Phys. A75, 449-465, 2002). Thermal effects are of small importance in this content. Thermal equilibration times are a function of heat conductivity to the substrate. Typical timescales are in the order of microseconds. Over longer times, maintaining a constant emission current, the NSE temperature may reach equilibrium with the surrounding thermal bath. Thermal effects due to single electron emission are negligible.

Electrons emerging from the gate electrode may be accelerated by arm anode or by the detector. It is possible to keep the detector at ground potential and bias the NSE to negative voltage. Accelerating voltages of a few kV are readily obtained in miniature vacuum devices. For example, 10 keV electrons may produce sizeable output signals from the detector. Since the electrons are mono-energetic and reach the detectors at average time intervals that are long compared to the detector response time, the output signals from the detector may exhibit a small voltage spread and well-defined time characteristics. These features are very important to identify Output signals as originating from field-emitted electrons. They facilitate discriminating the true electron signals from detector noise, or any another background radiation.

Concerning electron detectors, many types can be employed. They should have high detection efficiency, high gain and fast response. The detector sensitivity allows single electron detection, with noise level much lower than the resulting single-electron signal. One of the best candidates is a solid-state PIN diode detector. For such a detector, 100% detection efficiency and high gain are expected with time resolution of hundreds of ps.

A differential discriminator with a window set between an upper and lower level accepts and transfers only true electron signals. Moreover, the electronics system can verify the origin of the detector pulse based on the signal time profile. The combined process may eliminate any accidental background radiation or amplifier noise. Thus, only true electron events may be processed by the timing measurement and clock bit electronics, thereby securing pure Poisson distribution for the arrival times of the electrons and rendering it easy to test the entropy of the device.

From the discriminators, the signals are channeled into two different processing units. In one unit, true random numbers are generated by directing the signals into a shift register that is controlled by clock generated time marks. In the second channel, random numbers are produced according to the time interval between successive electron pulses. In the latter, the pulse from the discriminator circuit enters a ring time to digital converter (RTDC). This special element might encompass, for example, 32 channels of time to digital converters. Each channel has independent start and stop commands. For a time span of 20 ns per channel, a time resolution of 100 ps is easily obtained. True electron pulses are channeled to the RTDC via a fan-out unit connected in parallel to all stop inputs of the RTDC. At any given time, only a single channel of the RTDC is active. The RTDC channels may measure time intervals sequentially, whereby the stop signal of each channel serves also as start signal for the next channel in line. The last channel of the RTDC may restart the first channel. Transfer of information from each channel to a buffer memory is faster than the full ring cycle time. This architecture may guarantee time measurements between successive electron events without dead time. In cases where no stop pulse arrives within the maximum time span of a channel, an overflow signal may activate the next channel in line. The overflow information may be transferred to the buffer memory for further data processing.

The buffer memory is capable of storing many conversion cycles of the RTDC and the clock generated bit-streams. Block transfer at high rates from the buffer memory to the PC may eliminate any dead time from the system. All tests of entropy content and adjustments may be performed in the central processor.

The TRNG device, including feed and output lines, may be shielded against RFI using a metal enclosure for the device and electronics, metal shielding of connecting cables, fiber optics communications, AC and RF filters and other established procedures within the framework of EM compatibility.

Observations of current stability of CNT sources have indicated two types of current fluctuations [see for example, N. Miyamoto et al. J. Vac. Sci. Technol. B21, 436, (2003)]. Fast (microsecond scale), non-cyclic fluctuations of about 10% in amplitude are common for NSE sources at current levels of 100 nA or more. At lower current levels the emission becomes much more stable. At the projected current level of <1 nA, good current stability is expected, leading to a stable random distribution off electron arrival times. Moreover, inserting a series shunt resistor to the cathode of the electron source may stabilize any remaining fast current-fluctuations. A second type of current variation is caused by mechanisms such as adsorption of gas molecules at the tip of the NSE. Such incidents are manifested in a sudden change of current, which can be large. Evidently, this is a non-periodic phenomenon. Thus, it may not disturb the random nature of the distribution of electron arrival times. However, it may change the average time and width of the distribution. There are a number of options to counter these effects. Since the average emission current is constantly monitored, the moment an average current variation occurs, the parameters for the randomness tests can be changed according to the new average current value. A second option is to stabilize the current against such events by introducing active current control electronics into the device.

For the case of 10 pA electron current, corresponding to an average electron detection rate of $6 \times 10^7$/s we may get an average delay time between successive electron events of about 16 ns. With 0.1 ns time resolution the average time between successive electrons represents 7 binary bits. We thus expect a random number generation rate of $4 \times 10^8$ bits/s. This is an extremely high rate compared to the present state of the art. Moreover, the RNG device of the present invention is small in size, enabling integration of 10 or more parallel generators on a standard PCB thereby increasing bit rate to over $10^9$ bits/s.

The following is a non-limiting description of embodiments of the invention. FIG. 1 illustrates a block diagram of the RNG device. The principal elements of the device may be as follows, without limitation:

1. A field emission gated electron source with a detector.
2. Emission control unit
3. Amplifier and discrimination units with a standard output pulse shaper.
4. Ring time to digital converter.
5. Shift register and Clock pulse sequencer.
6. Buffer memory.

The emission control unit supplies bias voltage to the gate and controls the average current. A probe for measuring the average current is included in the unit. Active stabilization of the emitted current is also provided for. The output signal from the detector is transferred to the amplifier. After amplification the pulses are analyzed by a set of discriminators, which only let through pulses originating from electron detection. The pulses originating from true electron detection are channeled to the ring time to digital converter, as well as to the clock-operated sequencer. Data is transferred to a buffer memory and from these to the central processing unit without imposing dead time on the electronics.

Figure 2:
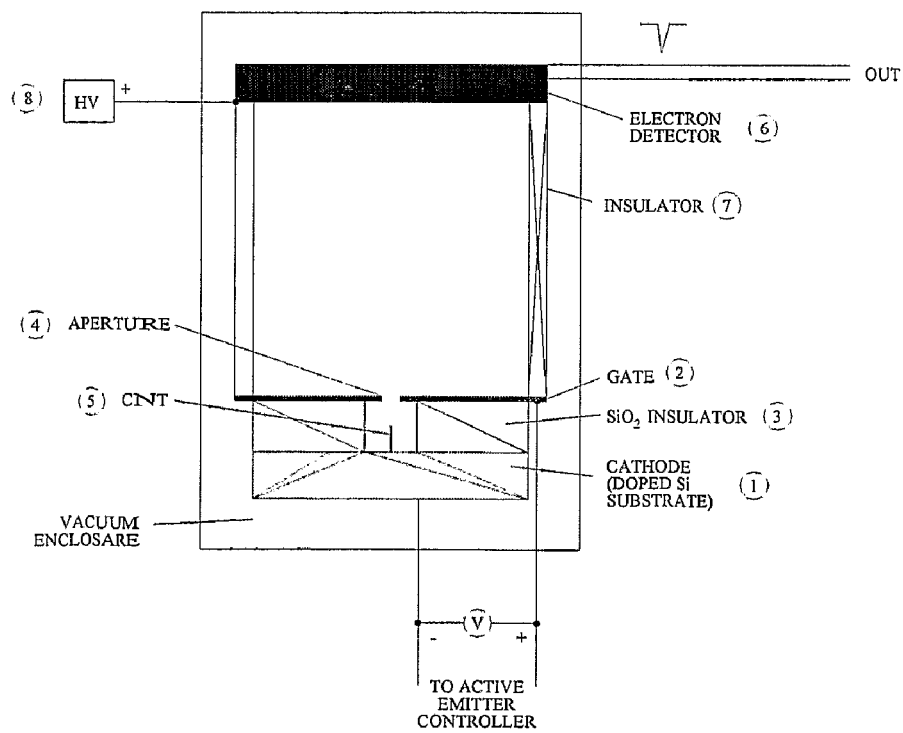
FIG. 2 shows the structure of the electron source and the detector, in accordance with an embodiment of the present invention.

FIG. 2 illustrates the electron source and detector. The cathode (1) of the emitter is a thin Si substrate. The cathode is electrically insulated from the gate electrode (2) by a thin Silicon Oxide layer (3). Typical insulation thickness is 1-2 micrometers. The gate electrode includes an aperture (4) of around 1 micrometer in diameter. The NSE (5) is concentric with the gate aperture. It is directed vertically at the cathode surface. NSE length is approximately equal to the insulator thickness. A single NSE or a plurality of aligned NSEs can serve as electron emitters. Another option of electron emitter is a Schottky emitter. In the drawing, the electron detector (6) serves as an accelerating anode. (7) is an insulator ring between gate and detector. The height of the second insulator (7) is of the order of 5 mm. The electron detector can be a solid-state device such as a PIN diode. It can also be an electron amplifier like MCP, or a multi-dynode vacuum electron multiplier. Phosphor screen coupled to a fast PMT is another detector option. The high voltage for electron acceleration is supplied by an external power supply (8). The integrated electron-source/detector is enclosed within a vacuum envelope. A getter pump is also included within the vacuum housing. Overall source dimensions are principally determined by vacuum considerations. The electron emitter, including the detector, may thus be minuscule in size.

The emitter control unit contains a variable voltage supply to bias the source gate, a current measurement probe for detecting electron current and an active stabilization electronics circuitry that controls the gate voltage, ensuring a constant current from the source. The entire emitter control unit is biased at the cathode voltage. This voltage ranges up to a few kV.

It is noted that FIG. 2 is just one example of a field emission gated electron source that can be used to carry out the invention. Another non-limiting example is a carbon nanotube in cathode well structure, described in U.S. Pat. No. 6,512,235, the disclosure of which is incorporated herein by reference. Briefly, U.S. Pat. No. 6,512,235 describes an electron source device comprising an electrode in the form of a shaped first layer, preferably in the form of a conducting crater carrying one or more nanotubes, and an extracting electrode, which is formed with one or more apertures and is insulated from the first layer. The cathode well configuration may reduce the switch-on voltage for the field emitter and thus allow implementation in a MEMS-type device with embedded electronics.

The emitter control unit contains a variable voltage supply to bias the source gate, a current measurement probe for detecting electron current and an active stabilization electronics circuitry that controls the gate voltage, ensuring a constant current from the source. The entire emitter control unit is biased at the cathode voltage. This voltage ranges up to a few kV.

The amplifier and discrimination unit contains a high gain linear amplifier to increase the detector pulse level to TTL, ECL or fast NIM standard, as required by the fast high and low pass discriminators. The electronic logic unit may only transfer pulses approved by both discriminators. A pulse shape discriminator can be included as well, in order to increase the reliability of true electron pulse discrimination. An output pulse of standard shape may be produced only for true electron arrival events at the detector.

Figure 3:
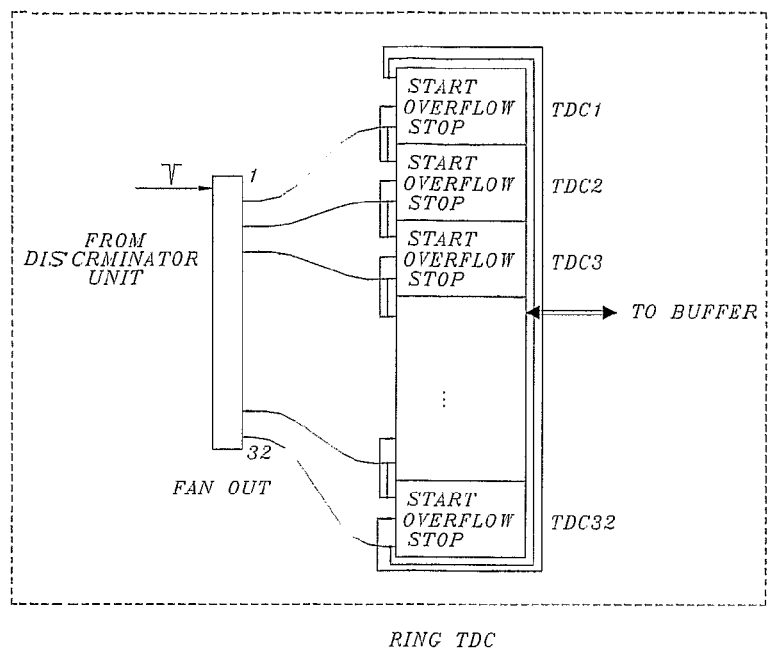
FIG. 3 illustrates the ring time to digital converter, in accordance with an embodiment of the present invention.

The output pulse from the discriminators is directed into a ring time to digital converter (RTDC). FIG. 3 illustrates, without limitation, a basic operation mode of the RTDC. The basic unit has many independent and parallel TDC channels. Each channel has its own independent start and stop commands. True electron arrival pulses are channeled to the RTDC via the fan-out unit shown. The outputs of the fan-out connect in parallel to all stop inputs of the RTDC channels. At any given time only a single channel of the RTDC is active. The stop signal of each channel also serves as a start signal for the next channel in line. The last channel in line restarts the first channel. The central processor may initialize the cycle of measurements, which subsequently run uninterrupted. The central processor may follow the streaming information and restart the device in case of accidental interrupt. Transfer of information from each RTDC channel to the buffer memory may be faster than the full ring cycle time. This architecture may guarantee time measurements between successive electron events without any dead time. In cases where no stop pulse arrives within the maximum time span of a channel, the overflow signal may activate the next channel in line. Data from all channels is transferred in a parallel bus to the buffer memory.

The clock operated output pulse sequencer is another unit that serves to generate a bit-stream of random bits. This is the common method of producing random numbers, employed in most RNG systems. True electron event pulses are also fanned out to the clock operated output pulse sequencer. The unit includes a clock and a shift register unit. The clock is set such that on average, an electron is detected once every two clock cycles. Random numbers, in bit-stream form, are transferred from the clock-operated sequencer to the buffer memory.

The buffer memory can accumulate many event cycles from the RTDC and clock-operated sequencer, transferring the data in blocks at high rate to the central processing unit. Information transfer is effected without imposing dead time on the measurement electronics.

Increased rates of random number production are achieved by using in parallel a number of basic TRNG units described above. Ten units are easily packed into a single vacuum enclosure. A single HV supply may bias all modules so that the accelerating voltage is the same for each. A schematics of a TRNG built of a plurality of individual TRNG described above is shown in FIG. 4.

Figure 4:
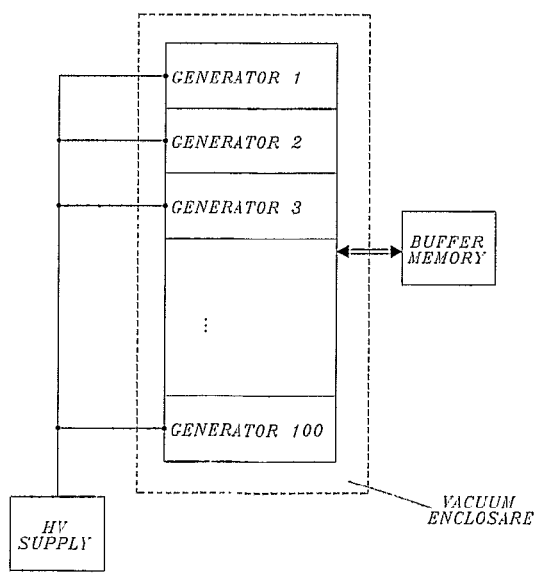
FIG. 4 shows parallel operation of independent generators, in accordance with an embodiment of the present invention.

FIG. 4 illustrates, without limitation, the schematics of a TRNG built of a plurality of individual TRNG modular units described above. The independent TRNG units are housed within a single vacuum enclosure and share a common HV power supply for biasing the detector.

What is claimed is:

1. A method for generating true random numbers, the method comprising:
   detecting field emission of electrons from a nano-size emitter (NSE) with a detector;
   processing an output signal from the field emission of electrons to generate random numbers; and
   detecting the field emission with a differential discriminator having a window set between an upper and lower level that accepts and transfers only true electron signals so as to eliminate accidental background radiation or amplifier noise.

2. The method according to claim 1, further comprising accelerating the electrons before detecting the field emission.

3. The method according to claim 1, wherein the field emission of electrons has a Poissonian distribution of emission time.

4. The method according to claim 1, comprising maintaining said detector at ground potential and biasing the NSE to a negative voltage.

5. The method according to claim 1, wherein the electrons are mono-energetic and reach the detector at average time intervals that are long compared to a response time of the detector.

6. The method according to claim 1, wherein processing the output signal comprises directing the signal into a shift register that is controlled by clock generated time marks and generating random numbers thereby.

7. The method according to claim 1, wherein processing the output signal comprises generating random numbers according to time intervals between successive electron pulses.

8. The method according to claim 1, further comprising channeling signals from the differential discriminator into two different processing units, wherein in one unit, true random numbers are generated by directing the signals into a shift register that is controlled by clock generated time marks, and in the other unit, random numbers are produced according to time intervals between successive electron pulses.

9. The method according to claim 8, wherein a pulse from the differential discriminator enters a ring time to digital converter (RTDC), having a plurality of channels of time to digital converters, each channel having independent start and stop commands.

10. The method according to claim 9, wherein at any given time, only a single channel of the RTDC is active, and wherein said channels measure time intervals sequentially, whereby the stop signal of each channel serves as the start signal for the next channel, and wherein the last channel of the RTDC restarts the first channel.

11. The method according to claim 1, wherein said NSE comprises at least one of nanotubes, nanorods, nanowires and gated nano-emitters.

12. The method according to claim 1, comprising generating random numbers at a rate greater than or equal to $10^9$ bit/s.

13. The method according to claim 1, wherein said detector comprises at least one of a PIN diode, phosphor screen, PMT (photomultiplier tube), multi-dynode vacuum electron multiplier, and MCP (micro-channel plate).

14. The method according to claim 1, comprising identifying the output signal by at least one of its pulse shape and pulse height.

* * * * *